(12) United States Patent
Takemoto et al.

(10) Patent No.: US 6,909,683 B2
(45) Date of Patent: Jun. 21, 2005

(54) OPTICAL DISC AND OPTICAL DISC DRIVE APPARATUS

(75) Inventors: Hiroyuki Takemoto, Miyagi (JP); Masayoshi Nagata, Kanagawa (JP)

(73) Assignee: Sony Corporation, Tokyo (JP)

(*) Notice: Subject to any disclaimer, the term of this patent is extended or adjusted under 35 U.S.C. 154(b) by 800 days.

(21) Appl. No.: 09/833,731

(22) Filed: Apr. 13, 2001

(65) Prior Publication Data

US 2002/0001278 A1 Jan. 3, 2002

(30) Foreign Application Priority Data

Apr. 28, 2000 (JP) .......................................... 2000-129216

(51) Int. Cl.[7] .................................................. G11B 7/00
(52) U.S. Cl. .................................. 369/59.25; 369/275.3
(58) Field of Search .......................... 369/275.3, 275.2, 369/275.4, 44.26, 59.25

(56) References Cited

U.S. PATENT DOCUMENTS 5,453,974 A  9/1995 Minoda et al.
6,044,051 A  * 3/2000 Miyagawa et al. .......... 369/47

FOREIGN PATENT DOCUMENTS

JP 04-301263  10/1992
JP 04-315823  11/1992

* cited by examiner

*Primary Examiner*—Nabil Hindi
(74) *Attorney, Agent, or Firm*—Oblon, Spivak, McClelland, Maier & Neustadt, P.C.

(57) ABSTRACT

An optical disc is disclosed, having tracks formed in a spiral shape or a concentric circle shape, each of the tracks being radially divided into a plurality of zones, data being recorded and/or reproduced at different angular velocities in the individual zones in such a manner that the angular velocity in the same zone is the same, wherein a buffer area is formed at a zone boundary, and wherein at least one pit portion is formed in the buffer area so that the pit portion is almost radially adjacent to a pit portion of a zone on the inner periphery side and a pit portion of a zone on the outer periphery side.

9 Claims, 5 Drawing Sheets

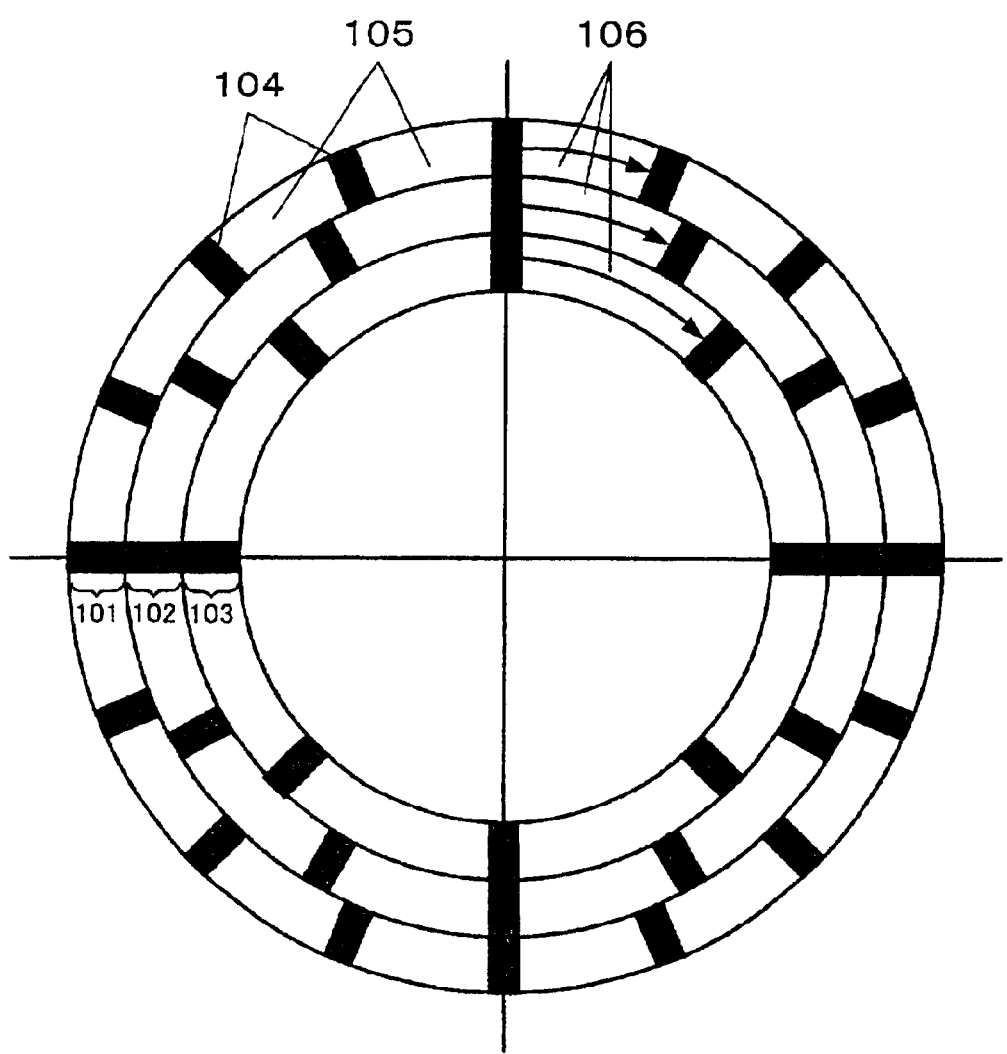

OPTICAL DISC AND OPTICAL DISC DRIVE APPARATUS

BACKGROUND OF THE INVENTION

1. Field of the Invention

The present invention relates to an optical disc and an optical disc drive apparatus.

2. Description of the Related Art

In recent years, optical discs that have advantageous characteristics of small size, large storage capacity, and high speed accessibility have become common at high pace. In each recordable optical disc (including a writable disc and a rewritable disc), grooves that cause record/reproduction laser light to be tracked to record tracks are pre-formed on a signal record surface in a concentric circle shape or a spiral shape. In other words, record tracks are formed along grooves formed in the concentric circle shape or the spiral shape. Data is recorded in grooves and/or areas between grooves (these areas are referred to as lands).

In such an optical disc, from view points of easy data handling and convenient data accessing, each record track is divided into sectors in the track direction. Thus, data is processed sector by sector. At the beginning of each sector, management information such as a physical address is pre-recorded as a pit portion. The record capacity for user data per sector is constant.

As rotating method for optical discs, CAV method, CLV method, and ZCAV method (also referred to as MCAV method) are known. In the CAV (Constant Angular Velocity) method, a disc is rotated at a constant velocity (constant number of rotations per second). The number of tracks per rotation on the inner periphery side is the same as that on the outer periphery side. When the number of rotations is constant, since the linear velocity on the outer periphery side of the disc is higher than that on the inner periphery side thereof, the length of the record area per sector increases in the direction of the outer periphery. As a result, in the CAV method, the data record capacity per disc is small.

In the CLV (Constant Linear Velocity) method, the linear velocity on the inner periphery side of the disc is the same as that on the outer periphery side thereof. In the CLV method, since the linear record density is constant, the data record capacity is large. On the other hand, it is necessary to control the rotation velocity of the disc corresponding to the position in the radius direction. Thus, the access velocity of the disc becomes low. In other words, the CLV method is not suitable for a recordable disc that requires high accessibility.

In the ZCAV (Zoned Constant Angular Velocity) method, using the advantages of easy rotation control and high accessibility of the CAV method, the disadvantage of which the record capacity is low can be solved. In the ZCAV method, the record surface of the optical disc is divided into a plurality of groups in the radius direction of the disc so that the basic frequencies of the groups differ from each other. These groups are referred to as zones. In each zone, one track is divided into several ten sectors to several hundred sectors. In each zone, the number of sectors is constant. Thus, an outer zone has more sectors. In each zone, the length (in the peripheral direction) of the record area per sector is almost the same. In the ZCAV method, the number of rotations of the disc differs in each zone. In each zone, the number of rotations of the disc is constant. The clock frequency differs in each zone.

FIG. 1 shows the structure of an optical disc corresponding to the ZCAV method. In FIG. 1, for simplicity, the disc is divided into three zones 101, 102, and 103 in the radius direction. In each zone, tracks are formed in a concentric circle shape or a spiral shape. As an example, grooves are pre-formed. Data is recorded on a land. Each track is divided into many sectors. At the beginning of each sector, a header portion 104 represented by a dirk area is preformed as a pit portion. A pit portion is formed corresponding to addresses information or the like. A header portion 104 is followed by a data record area 105.

For simplicity, in the zone 101 on the outer periphery side, 16 sectors are formed. In the zone 102 on the inner periphery of the zone 101, 12 zones are formed. In the zone 103 on the innermost periphery side, eight sectors are formed. Reference numeral 106 represents the minimum sector length of each zone. In reality, more zones than those shown in FIG. 1 are formed. The number of sectors that differ between adjacent zones is one to several sectors.

In the ZCAV method, the header portions 104 are radially adjacent. In other words, in different zones, the header portions 104 are not aligned. However, normally, in different zones, there is at least one position of which the header portions 104 are radially adjacent. In the example shown in FIG. 1, the header portions 104 are radially aligned at intervals of 90°.

As in FIG. 1, FIG. 2A shows the structure of a conventional optical disc. FIG. 2B is an enlarged view showing a portion 201 in which header portions are radially adjacent in different zones. In FIG. 2B, reference numeral 202 represents a part of a zone on the outer periphery side. Reference numeral 203 represents a part of a zone on the inner periphery side. Reference numeral 204 represents a header area. Reference numeral 205 represents a data record area. In the header area 204, a pit portion 206 is formed. On each track, a pit portion 206 and data are recorded on a land surrounded by grooves 207. A zone boundary is represented by a broken line 208.

As in FIG. 1, FIG. 3A shows the structure of a conventional optical disc. FIG. 3B is an enlarged view showing a portion 301 of which header portions are not adjacent in different zones and of which a header portion and a data record area are adjacent. In FIG. 3B, reference numeral 302 represents a part of a zone on the outer periphery side. Reference numeral 303 represents a part of a zone on the inner periphery side. Reference numeral 304a represents a header area of the zone on the outer periphery side. Reference numeral 304b represents a header area of the zone on the inner periphery side. Reference numeral 305a represents a data record area of the zone on the outer periphery side. Reference numeral 305b and 305c represent data record areas of the zone on the inner periphery side. Pit portions 306 are formed in the header areas 304a and 304b. A pit portion 306 and data are recorded on a land surrounded by grooves 307 of each track. A zone boundary 308 is represented by a dotted line 308. The header area 304a and the data record area 305b are adjacent with the zone boundary 308. In addition, the header area 304b and the data record area 305a are adjacent with the zone boundary 308.

When a header portion and a data record area are adjacent with a zone boundary as shown in FIG. 3B, a crosstalk that takes place from the header portion (pit portion) to the data record area increases. As a result, recorded data may not be correctly reproduced. This is because when a base material of the disc is formed, an optical distortion-that takes place around the pit portion becomes an optical aberration in the data record area. To solve such a problem, the following related art references are known.

In one related art reference disclosed as Japanese Patent Laid Open Publication No. 4-301263, a zone boundary is a buffer area (non-recordable area). However, in the related art reference, there is a portion of which the pit portion of the non-recordable area is adjacent to the data record area. Thus, it is difficult to prevent a crosstalk from taking place in the data record area.

In another related art reference disclosed as Japanese Patent No. 2972900, a zone boundary is formed using only grooves without a pit portion. In the related art reference, the buffer area is effective against a crosstalk. However, when a seeking operation is performed, if this area is accessed, since there is no pit portion that represents an address, position information cannot be obtained.

OBJECTS AND SUMMARY OF THE INVENTION

Therefore, an object of the present invention is to provide an optical disc and an optical disc drive apparatus that prevent a crosstalk from taking place and to accurately obtain position information at a zone boundary in an accessing operation.

A first aspect of the present invention is an optical disc having tracks formed in a spiral shape or a concentric circle shape, each of the tracks being radially divided into a plurality of zones, data being recorded and/or reproduced at different angular velocities in the individual zones in such a manner that the angular velocity in the same zone is the same, wherein a buffer area is formed at a zone boundary, and wherein at least one pit portion is formed in the buffer area so that the pit portion is almost radially adjacent to a pit portion of a zone on the inner periphery side and a pit portion of a zone on the outer periphery side.

A second aspect of the present invention is an optical disc drive apparatus using an optical disc having tracks formed in a spiral shape or a concentric circle shape, each of the tracks being radially divided into a plurality of zones, data being recorded and/or reproduced at different angular velocities in the individual zones in such a manner that the angular velocity in the same zone is the same, wherein a buffer area is formed at a zone boundary of the optical disc, wherein at least one pit portion is formed in the buffer area so that the pit portion is almost radially adjacent to a pit portion of a zone on the inner periphery side and a pit portion of a zone on the outer periphery side, wherein the pit portions represent address information, and wherein a desired position is accessed corresponding to the pit portions.

According to the present invention, since a pit portion in a buffer area of a zone boundary is almost radially aligned to pit portions of zones on the inner periphery side and the outer periphery side in the radius direction, a data record area is not adjacent to a pit portion in the radius direction. Thus, a crosstalk does not take place from the pit portion to the record track. In the buffer area, with a pit portion having address information, position information of the disc can be easily obtained.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1 is a schematic diagram showing an example of the structure of a conventional optical disc;

DETAILED DESCRIPTION OF THE PREFERRED EMBODIMENT

Figure 4:
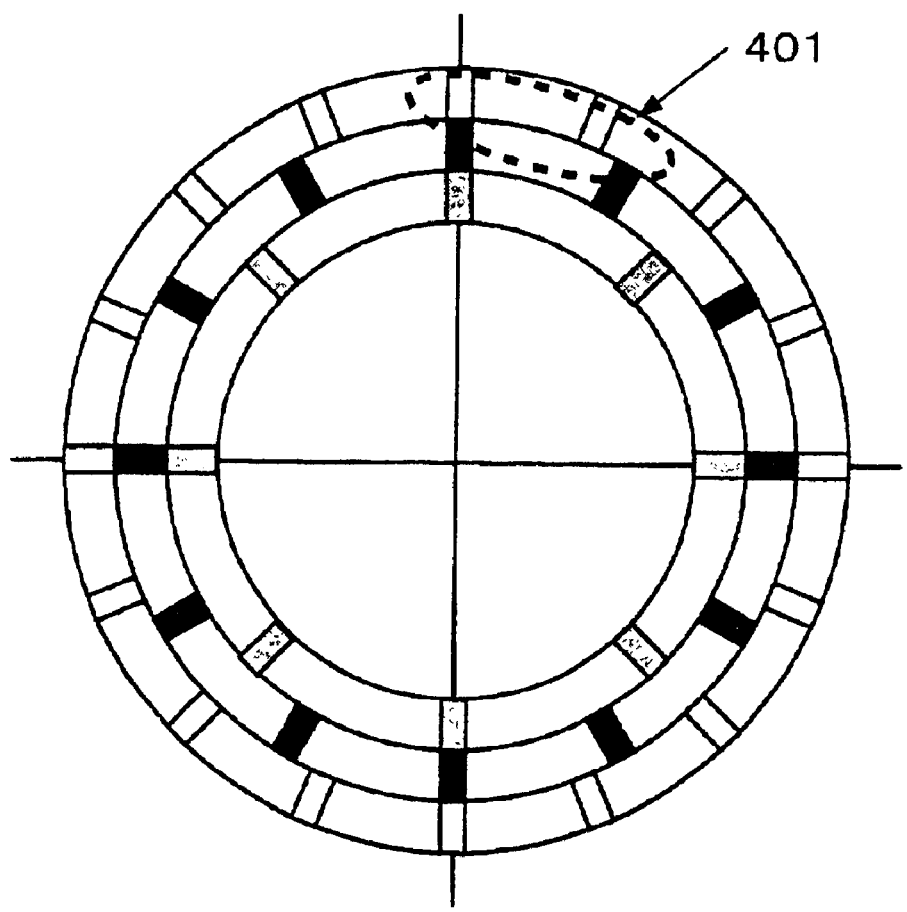
FIG. 4 is a schematic diagram for explaining an example of the structure of an optical disc according to the present invention.

Next, an embodiment of the present invention will be described. FIG. 4 shows the structure of a disc corresponding to the ZCAV method according to the present invention. FIG. 4 shows zones, header portions, and sectors formed on the optical disc as in FIG. 1. Referring to FIG. 4, the record surface of the disc is radially divided into three zones. In each zone, tracks are formed in a concentric circle shape or a spiral shape. Each track is divided into many sectors. At the beginning of each sector, a header portion represented by a dirk area is pre-formed as a pit portion. A header portion is followed by a data record area.

In a zone on the outer periphery side, 16 sectors are formed. In a zone on the inner periphery, 12 zones are formed. In a zone on the innermost periphery side, eight sectors are formed. The number of zones and the number of sectors of each zone are just examples. In reality, more zones than those shown in FIG. 4 are formed. The number of sectors that differ between adjacent zones is one to several sectors.

In the ZCAV method, the header portions of each zone are radially adjacent. In other words, in different zones, the header portions are not aligned. However, normally, in different zones, there is at least one position of which the header portions are radially adjacent. In the example shown in FIG. 1, the header portions are radially aligned at intervals of 90°.

In each zone, grooves are pre-formed in a concentric circle shape or a spiral shape. A pit portion of a header portion and data are recorded on a land formed between adjacent grooves. The grooves may be wobbled with a small amplitude in the disc radius direction. Data may be recorded corresponding to for example the phase change method, the magneto-optical method, or the organic die-based method as long as an optical recording method is used.

Figure 5:
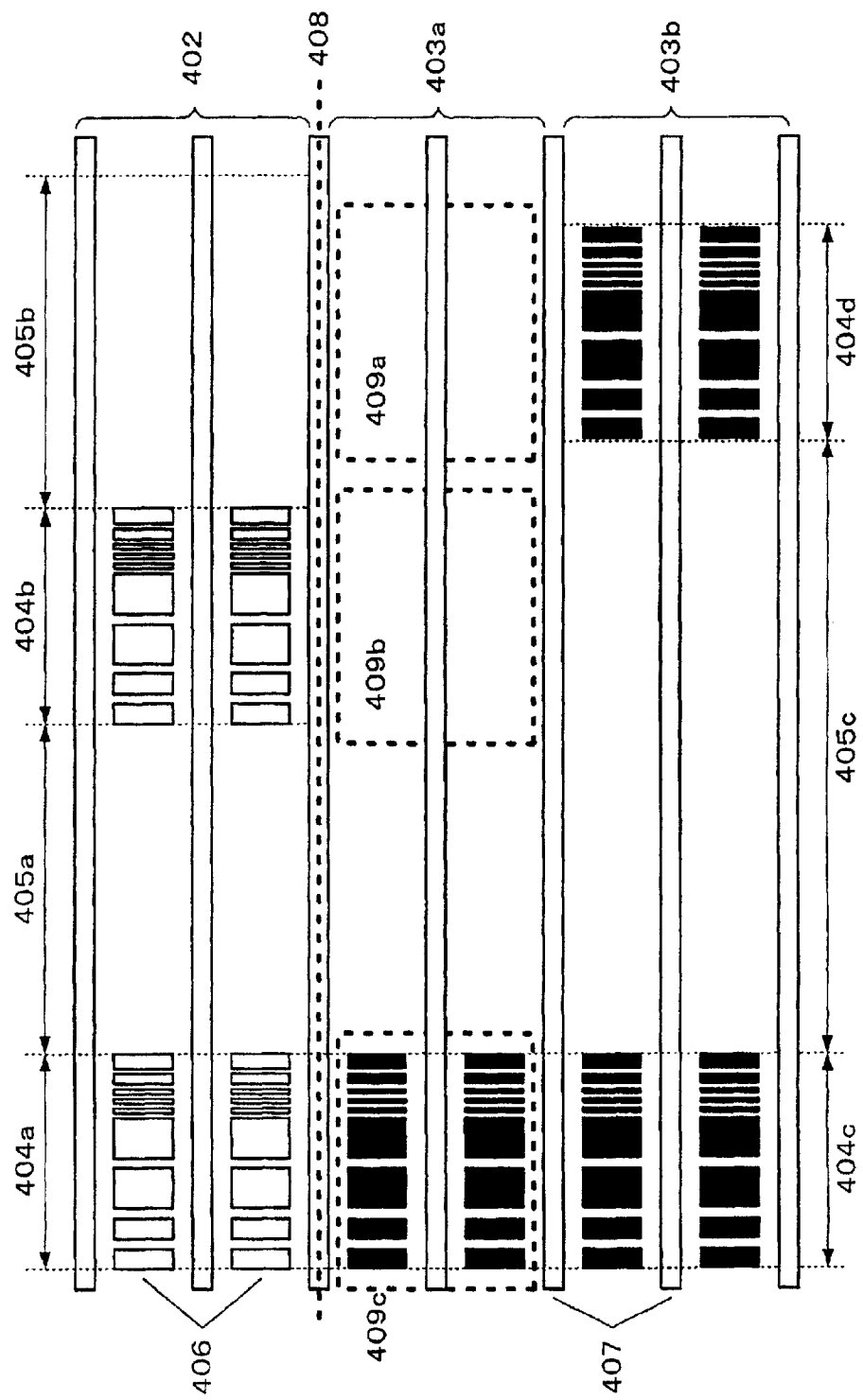
FIG. 5 is a schematic diagram showing the structure of an optical disc according to an embodiment of the present invention.

FIG. 5 is an enlarged view showing the structure of a zone boundary portion 401. In FIG. 5, reference numeral 402 represents a part of a zone on the outer periphery side. Reference numerals 403a and 403b represent a part of a zone on the inner periphery side. The part 403a (for example, two tracks) of a zone on the inner periphery side adjacent to a zone boundary (represented by a dotted line) 408 is a buffer area (non-recordable tracks). Reference numerals 404a and 404b represent header areas of the part 402 of the zone on the outer periphery side. Reference numerals 404c and 404d represent header areas of the part 403b of the zone on the inner periphery side. Reference numerals 405a and 405b represent data record areas of the part 402 of the zone on the outer periphery side. Reference numeral 405c represents a data record area of the part 403b of the zone on the inner periphery side.

In the part 403a of the zone on the inner periphery side as a buffer area, a portion 409a that is not a pit portion is adjacent to the data record area 405b of the zone on the outer periphery side. On the other hand, in the part 403a, a pit portion 406 that is adjacent to pit portions 406 of the zones on the inner periphery side and the outer periphery side is formed in an area 409*c*. Corresponding to the ZCAV method, there is at least one position of which header portions are adjacent in different zones. In other words, corresponding to the ZCAV method, there is at least one position of which header portions are radially aligned in different zones. In the example of the disc shown in FIG. 4, there are positions of which header portions are adjacent in different zones at intervals of 90°.

In the embodiment, since a pit portion is not formed in the area 409*a*, a crosstalk does not take place in the data record area 405*b* of the part 402 of the zone. In the area 409*a*, a crosstalk takes place due to the pit portion of the part 403*b* of the zone. In the area 409*b*, a crosstalk takes place due to the pit portion of the part 402 of the zone. However, since the areas 409*a* and 409*b* are formed as buffer areas, data is not recorded. Thus, no problem substantially takes place.

In an optical disc drive using the optical disc according to the embodiment of the present invention, a laser beam is radiated to the record surface through an objective lens. Thus, data is recorded. In addition, data is reproduced using reflected light of the laser beam. In the magneto-optical disc drive, the magnetic field is modulated with data. In addition, address information of a header portion is read. Corresponding to the address information, data is recorded to a desired sector. In addition, corresponding to the address information, data is reproduced from a desired sector.

When the optical disc according to the present invention is used, data is prohibited from being recorded to the buffer area. However, address information recorded in a header portion of at least one header portion formed in the buffer area is used for a seeking operation. Thus, in comparison with a conventional optical disc of which address information is not recorded in a buffer area, address information can be sufficiently prevented from being lost. Thus, the time necessary for the seeking operation can be decreased. In other words, the accessibility can be improved.

Figure 2A:
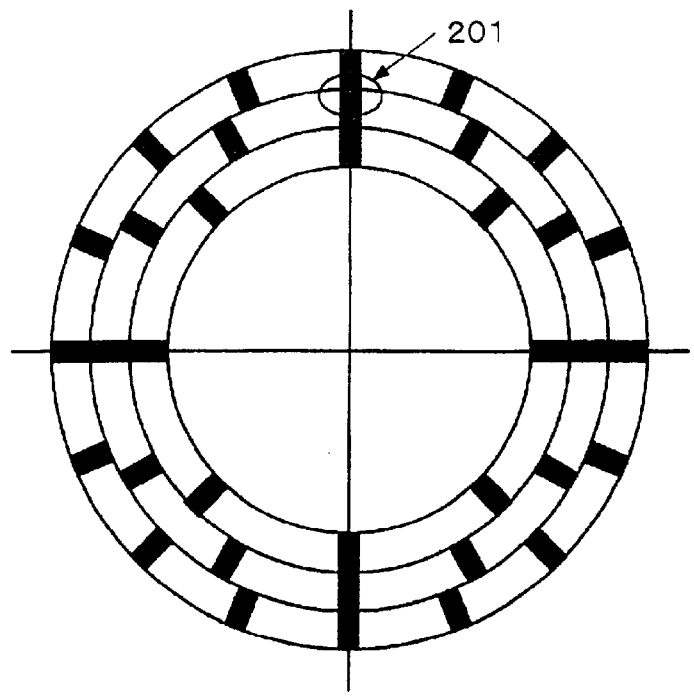
FIGS. 2A and 2B are schematic diagrams for explaining the structure of a conventional optical disc.
Figure 2B:
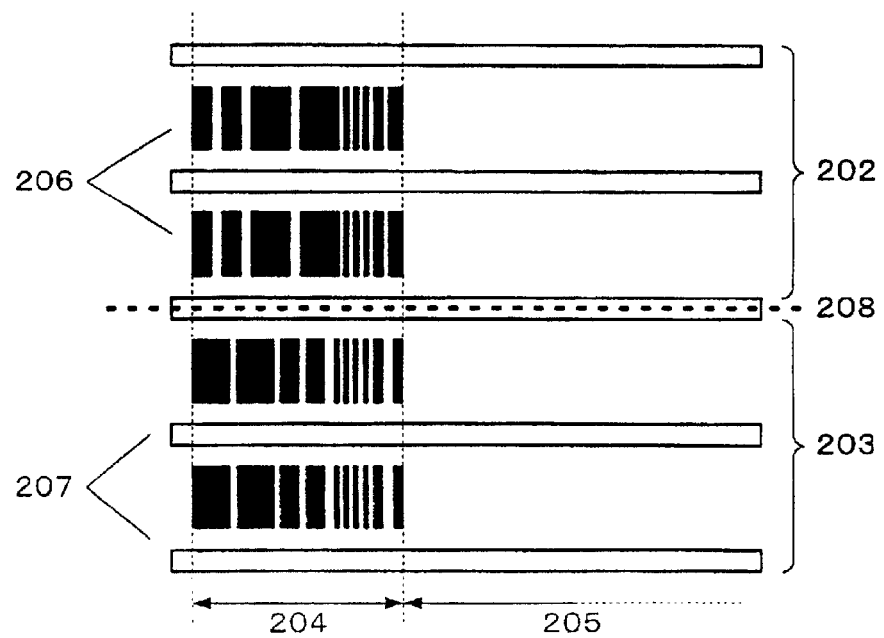
Figure 3A:
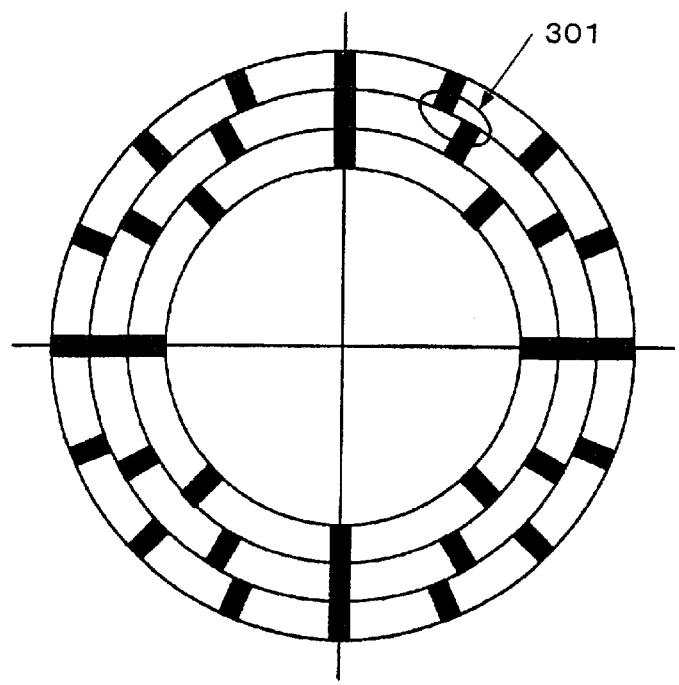
FIGS. 3A and 3B are schematic diagrams for explaining the structure of a conventional optical disc.
Figure 3B:
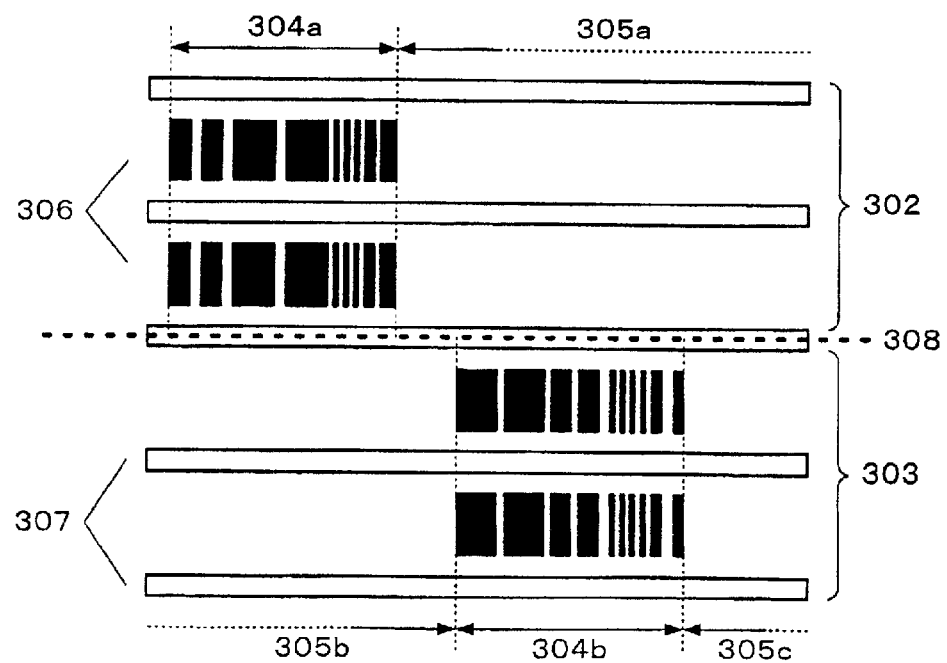

It should be noted that the present invention is not limited to the above-described embodiment. In other words, various modifications and changes of the embodiment can be performed without departing from the spirit and scope of the present invention. In the example shown in FIG. 2, pit portions as header portions perfectly match. However, as long as a crosstalk due to the deviation of the pit portions is smaller than a permissible level, they may slightly deviate.

In the example shown in FIG. 5, the boundary portion 403*a* that is a buffer area belongs to a zone on the inner periphery side. Alternatively, the boundary portion 403*a* may belong to a zone on the outer periphery side. In addition, both a zone on the inner periphery side and a zone on the outer periphery side may have respective buffer areas. However, since the buffer area is a non-recordable area, when a buffer area is formed in a zone on the inner periphery side having lesser sectors than a zone on the outer periphery side, the record capacity can be prevented from decreasing with the buffer area.

According to the present invention, since a pit portion for an address or the like is not adjacent to a data record area, a crosstalk does not take place from the pit portion to the data record area. Thus, the quality of reproduced data can be improved. In addition, since address information is recorded in a buffer area, the address information can be prevented from being lost in a seeking operation. Thus, the accessibility can be improved.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An optical disc having tracks formed in a spiral shape or a concentric circle shape, each of the tracks being radially divided into a plurality of zones, data being recorded and/or reproduced at different angular velocities in the individual zones in such a manner that the angular velocity in the same zone is the same, wherein a buffer area is formed at a zone boundary, and
   wherein at least one pit portion is formed in the buffer area so that the pit portion is almost radially adjacent to a pit portion of a zone on the inner periphery side and a pit portion of a zone on the outer periphery side.

2. The optical disc as set forth in claim 1,
   wherein a groove is formed in the buffer area.

3. The optical disc as set forth in claim 1,
   wherein the period of the pit portions is the same as a basic clock frequency of one of the zones on the inner periphery side and the outer periphery side.

4. The optical disc as set forth in claim 1,
   wherein the pit portions represent address information.

5. The optical disc as set forth in claim 1,
   wherein the pit portions are formed on at least one of a groove and a land.

6. An optical disc drive apparatus using an optical disc having tracks formed in a spiral shape or a concentric circle shape, each of the tracks being radially divided into a plurality of zones, data being recorded and/or reproduced at different angular velocities in the individual zones in such a manner that the angular velocity in the same zone is the same, wherein a buffer area is formed at a zone boundary of the optical disc,
   wherein at least one pit portion is formed in the buffer area so that the pit portion is almost radially adjacent to a pit portion of a zone on the inner periphery side and a pit portion of a zone on the outer periphery side,
   wherein the pit portions represent address information, and
   wherein a desired position is accessed corresponding to the pit portions.

7. The optical disc drive apparatus as set forth in claim 6,
   wherein a groove is formed in the buffer area of the optical disc.

8. The optical disc drive apparatus as set forth in claim 6,
   wherein the period of the pit portions is the same as a basic clock frequency of one of the zones on the inner periphery side and the outer periphery side.

9. The optical disc drive apparatus as set forth in claim 6,
   wherein the pit portions are formed on at least one of a groove and a land.

* * * * *